United States Patent [19]

Godar

[11] 4,324,656

[45] Apr. 13, 1982

[54] INSTALLATION FOR THE WITHDRAWAL AND PURIFICATION TREATMENT OF WATERS AND AQUEOUS EFFLUENTS

[76] Inventor: Serge E. Godar, Avenue des Croix de Guerre, 330, 1120 Bruxelles, Belgium

[21] Appl. No.: 84,032

[22] Filed: Oct. 11, 1979

[30] Foreign Application Priority Data

Oct. 24, 1978 [BE] Belgium .................................. 46 646

[51] Int. Cl.³ ............................. C02F 1/74; C02F 1/52
[52] U.S. Cl. ..................................... 210/170; 210/202; 210/207; 210/220; 210/242.2; 210/256; 210/258; 210/262; 210/521
[58] Field of Search ............... 210/151, 170, 199, 202, 210/203, 207, 242 R, 242 A, 256, 258, 261, 262, 521, 522

[56] References Cited

U.S. PATENT DOCUMENTS

| | | | |
|---|---|---|---|
| 2,190,596 | 2/1940 | Dorr | 210/199 X |
| 2,778,499 | 1/1957 | Chamberlain et al. | 210/44 X |
| 3,441,956 | 4/1969 | Farnham | 210/199 X |
| 3,579,554 | 5/1971 | Boudreau | 210/63 R X |
| 3,716,485 | 2/1973 | Robertson | 210/256 X |
| 3,810,543 | 5/1974 | Lundqvist | 210/199 |
| 3,893,656 | 7/1975 | Opacic et al. | 210/199 X |
| 3,948,774 | 4/1976 | Lindman | 210/199 X |
| 4,113,619 | 9/1978 | Arrington | 210/199 X |
| 4,190,539 | 2/1980 | Besik | 210/202 X |
| 4,200,534 | 4/1980 | Besik | 210/199 X |

FOREIGN PATENT DOCUMENTS 2656362  6/1978  Fed. Rep. of Germany ...... 210/199

*Primary Examiner*—Robert H. Spitzer
*Attorney, Agent, or Firm*—Martin A. Farber

[57] ABSTRACT

The installation comprises two essential elements, on the one hand a water intake apparatus in which various operations of physical and chemical treatment are carried out and, on the other hand, a more elaborate purification apparatus controlled by the intake apparatus, particularly with respect to the transfer of the waters to be treated, this transfer from the intake to the settling being effected by means of a single pump the controlled rate of flow of which conditions the entire treatments up to the settling.

9 Claims, 1 Drawing Figure

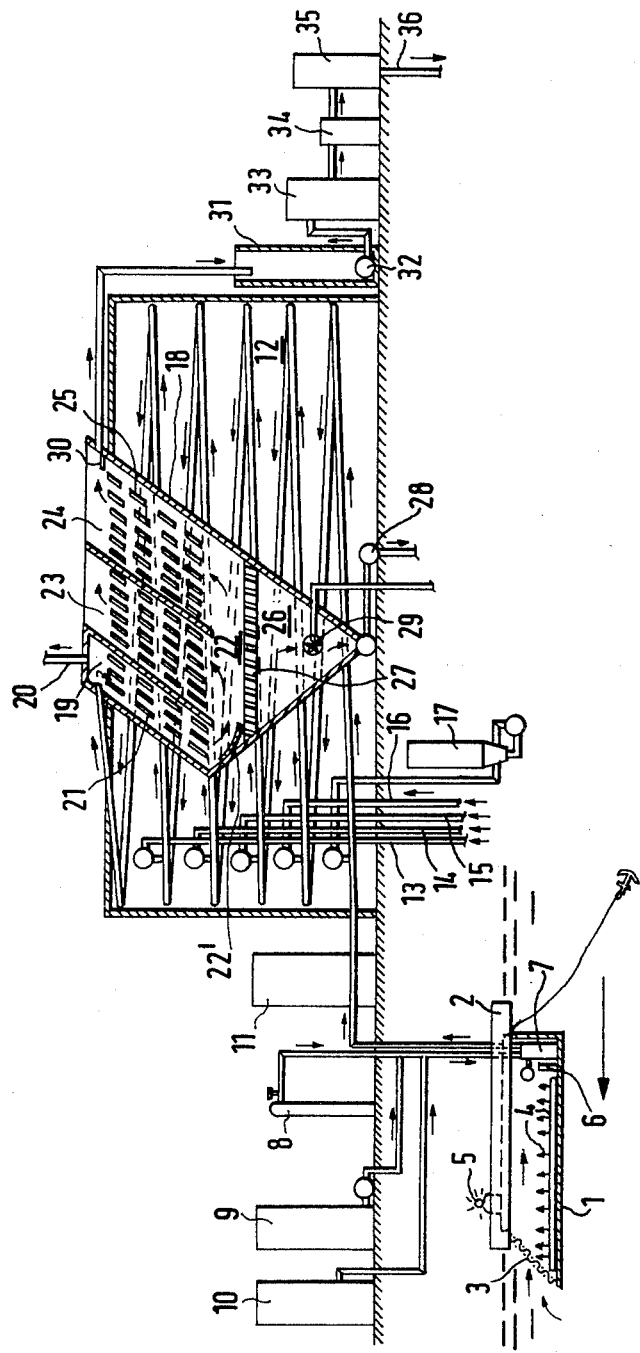

INSTALLATION FOR THE WITHDRAWAL AND PURIFICATION TREATMENT OF WATERS AND AQUEOUS EFFLUENTS

The conventional withdrawal and purification treatment of waters and aqueous effluents of various origin generally comprise the following steps:

(1) Removal of these waters and aqueous effluents by means of one or more pumps, with elimination or reuse of these waters or else the addition of reagents in order to effect a change in concentration of one or more inorganic or organic substances in said waters or effluents.

These conventional treatments generally require extensive areas, a large amount of apparatus and a substantial infrastructure, the cost of which is relatively high.

While in the case of large public or industrial needs the costs are justified, this is not true in the case of small rates of flow (for instance less than 50 m$^3$/hour), particularly when they are limited in time or are occasional or when these installations are stationary or movable.

On the other hand, the general concept of large installations can be extrapolated only with difficulty to small installations when the latter are to be compact and light and the duration of each complete step of the treatment or treatments is limited in time for these reasons.

This is particularly true of mobile installations since in this case in order to obtain optimum efficiency it is necessary to assure complete treatment steps which, however, are of well-defined duration, which factors affect the size and/or weight of the installation to be transported, with therefore, in particular, a repercussion on the cost of the installation and of the overall treatment.

The present invention relates to a compact, simplified installation for the removal and different purification treatments of waters and aqueous effluents of various origin, which installation is preferably mobile, without this latter feature being limitative. The expression "mobile" is to be understood also as portable.

The compactness and simplification of the plant also relate to the decrease in the overall weight when this latter factor is important for the means of transportation contemplated (airplane, boat, land vehicle).

The installation forming the object of the present invention is characterized by the fact that it comprises two essential elements, on the one hand a water intake apparatus in which various operations of physical and chemical treatment are carried out and on the other hand a more elaborate purification apparatus which is dependent on the intake apparatus, particularly with respect to the transfer of the waters or aqueous effluents to be treated, this transfer from the intake to the sedimentation being effected by means of a single pump the controlled rate of flow of which conditions the entire treatments up to the sedimentation.

In accordance with the invention, the water intake apparatus comprises a compartment for aeration obtained by the liberating of compressed air in the form of fine bubbles, the rate of flow of injected air being adaptable to the rate of flow of the waters or effluents to be treated.

In accordance with the invention furthermore the intake pump is arranged in such a manner that it draws the water and the aqueous effluents in through the intake apparatus while permitting their aeration, delivers the waters and the aqueous effluents to the extensive purification apparatus, and makes it possible to effect a chemical pre-treatment by gaseous or liquid reagents by injection of reagents in the water or aqueous effluent inlets into said pump.

The treatment installation proper of the invention comprises, in order, a continuous tubular reactor, a settler of the accelerated settling type, and one or more filters.

In accordance with the invention, the continuous tubular reactor is formed of a pipe or tube arranged in superimposed concentric turns.

Furthermore in accordance with the invention, the settler is in the form of a prismatic reservoir arranged on top of a hopper and has a series of compartments, the oblique upper compartments of which are side by side, the inlet being located in the first of these compartments where the water charged with particles flows downward while the flow is upward in the other oblique compartments, a horizontal compartment opening up under these oblique compartments and above a lower compartment forming the hopper intended for the evacuation of the particles in the form of sludge.

In order better to understand the invention, it will now be described in further detail on basis of the accompanying diagrammatic drawing of one embodiment of an installation for the withdrawal and purification treatment of waters and aqueous effluents.

The installation shown in the drawing comprises a water intake apparatus consisting of a partially immersed receptacle 1 supported by floats 2 (floating intake). The outer shape of this receptacle is adapted to its possible use in flowing water or flowing effluents, that is to say with a hydrodynamic front so as to permit easy flow of the waters and aqueous effluents when they are in movement. The anchoring point must be such that the streamlined shape presents itself to the flow. The rear consists of an inclined grid 3, preferably of an inclination of 45°, through which the waters or aqueous effluents to be treated enter into the floating intake.

The arrangement of the grid at the rear and its inclination are for the purpose of considerably decreasing the accumulation of debris thereon. The size of the meshes, on the order of 2 mm, is so selected that the most different objects (wood, leaves, possible animals) cannot penetrate into the apparatus. The size of the meshes and the inclination of the grid also permit a partial unclogging of the grid by air injected behind the grid (acute-angle side). This grid may be a double grid so that one of the two of them can be unclogged without interrupting the operation of the entire installation.

The portion located behind the grid is formed of a compartment 4, for aeration obtained by liberation of compressed air in the form of fine bubbles, by means of porous tubes or plates for example. The rate of flow of injected air can be adapted to the rate of flow of the waters or effluents to be treated, so that each liter of the latter is aerated by a selected amount of air, preferably between 1 and 50 liters. This injection of air has the purpose of partially or completely eliminating by displacement the volatile substances dissolved or dispersed in the water (such as malodorous and/or toxic products and/or light hydrocarbons, etc.). This operation also avoids the introduction into the apparatus of floating substances such as oils, heavy hydrocarbons, etc. The aerated part therefore starts below the grids and terminates at a distance such that the ratio of the volume of air to water is preferably between 1 and 50.

The system for the liberation of compressed air is protected by a grid, which also has the function of better distributing the bubbles of air.

The degree of immersion of the apparatus is such that the open edge of this compartment does not permit the reentry of water which has not passed through the grid 3. The edge extends about 5 cm to 10 cm above the surface of the waters or aqueous effluents to be treated.

The adjustment of the horizontality of the floating intake is effected by a movable counterweight, preferably placed at the upper part, on the central axis in the direction of the length of the apparatus. It may consist of a flashing light 5 provided with dry cells or storage batteries, serving as position indicator during the night.

The aeration compartment 4 terminates in a partition 6 the height of which from the bottom is such that the bubbles of air liberated cannot enter into the last compartment, in which the immersed intake pump 7 is located.

This pump has several functions:

a. It draws the water or aqueous effluents in from the rear of the floating intake towards the front thereof, assuring the screening thereof through grids located at the rear;

b. It permits the aeration of the waters or aqueous effluents by transferring them from the rear to the front;

c. It pumps the water or aqueous effluents towards the extensive purification apparatus, which is generally located on land;

d. It furthermore makes it possible to effect a chemical treatment by gaseous or liquid reagents, by inserting one or more reagent feed tubes into the inlets for the waters or aqueous effluents into the pump proper.

With respect to the injection of reagents in solution (9), this system is not in principle limitative as to the number of solutions. It furthermore permits effective contact between the water or aqueous effluents to be treated and the reagents.

With respect to the injection of gaseous reagents (8, 10), such as for instance chlorine, chlorine dioxide, sulfur dioxide, ozone, etc., they can, for instance, in this way be introduced into the treatment circuit under low pressure when the latter is connected to its production system.

For certain types of pumps one is, however, limited as to this type of injection when the rate of flow of the gaseous reagent is too great, since an unpriming of the pump may take place. This system is of particular interest for products which may undergo decomposition in metering pumps, such as for instance hydrogen peroxide.

One of the characteristics of this pump is that it is provided with a float cutout which controls the starting and stopping of one or more pumps and metering pumps, valves, alarms, etc. inserted in the overall treatment circuit. Another characteristic of this pump is that it is fastened on a frame which in its turn is detachable from the floating intake.

To this frame there are fastened the delivery pipe of the pump and the feed conduits for the liquid or gaseous reagents. The air inlet which feeds the aeration system is fastened to the floating intake.

The frame to which the pump and the conduits for the feeding of the gaseous and/or liquid reagents are fastened is detachable from the floating intake so that it is possible to use it for water or aqueous-effluent intakes in cases in which the depth is not sufficient to permit the use of the floating intake (for instance in the case of streams or gutters).

This frame may be placed in a receptacle of cylindrical shape of small height provided with a grid at its upper part, so that the water or the aqueous effluents can penetrate through said opening so as to reach the pump without entraining debris and particularly mud or deposits.

It goes without saying that within the scope of the system proposed the intake pump (preferably of self-priming type) can be placed on solid ground, provided that its suction conduit (with or without foot valve) is located at the same place on the floating intake as the water intake of the immersed pump of the first description was.

It also goes without saying that under these conditions the conduits for the feeding of the gaseous or liquid reagents are close to or within this water suction pipe. It is thus obvious that the float cutout which controls the pump and other controlled systems is also in the floating intake. It goes without saying that the nature of the materials used is such that they withstand the action of the waters to be treated and the reagents employed. With regard to the hydraulic and electric connections, they are effected by water-tight couplings, preferably of the rapid type.

In the foregoing description, it has been assumed that the water intake apparatus was immersed in the flow of the waters or aqueous effluents to be treated but, of course, it may also be arranged, in accordance with the invention, on the ground in a tank of a design similar to the floating intake previously described (grids, aeration compartment, pump) but the feeding with waters or aqueous effluents of said tank is effected via either an immersed pump and a connecting pipe or a pump placed on the ground and a connecting pipe, provided that its suction conduit (with strainer and with or without foot valve) extends into the water or effluent.

The installation furthermore comprises a purification apparatus which may be fixed or movable and which consists of a board 11 for control and connection with the floating intake 1, a treatment installation proper and auxiliary apparatus.

The control board 11 has various connections by flexible pipes and wires between the floating intake, the purification installation proper and the auxiliaries (compressors, generators of gaseous reagents or reagents in solution, electric conductors). It also has various monitoring systems (adjustable valves, flow meters, pressure gauges, thermometers and analytical instruments).

On its part the treatment installation comprises a continuous reactor, a settler and filters.

The treatment of the various waters and aqueous effluents consists primarily in adding reagents in quantities which are determined as a function of the nature and concentration of the contaminant or contaminants, the volume to be treated, and the time necessary for the chemical reactions to take place in order to obtain a water or effluent which satisfies the purification criteria.

Since in certain cases the volume and/or weight of the installation are important factors, it is necessary to carry out each purification reaction in the shortest possible time, which means perfect homogeneity of the mixture of water to be treated and reagents, particularly if the latter are only slightly soluble or insoluble (as in the case of the introduction of organic and inorganic ion exchange resins or adsorbents). It is furthermore of interest completely to use up the gaseous reagents (chlorine, carbon dioxide, sulfur dioxide, chloride dioxide, ozone, etc.).

Now, a partial loss of these reagents is frequently noted in practice, resulting in the risk of gaseous pollution and danger to the persons working near the installation. This occurs generally in treatment tanks which are placed in series in a conventional purification installation.

For this reason there has been preferred, in accordance with the invention, a continuous tubular reactor 12 formed of a pipe or tube whose dimensions are a function of the rate of flow of water to be treated and of the total time necessary to carry out all the chemical purification reactions. As each reaction must take place within a given period of time, injection points for reagents are arranged at different lengths along said pipe, these injection points being fed by metering pumps having reagent tanks 13 to 17. As the chemical and physical purification reactions at times employ solid and generally insoluble products and on the other hand precipitates are formed, the concept of such a treatment reactor imposes a linear velocity of the fluid (water or effluents plus reagents in solution and/or in suspension plus precipitates) such that no settling takes place within the reactor. Therefore there is imposed a linear speed of the fluid of between 0.40 and 1 m/second and preferably 0.55 and 0.70 m/second.

Furthermore it is considered that a total decontamination treatment (before the separation of solids/purified liquid) should not last longer than 30 to 45 minutes, without this time constituting a limitation. For these conditions, given by way of example, one obtains the theoretical limit lengths which the tubular reactor may have, namely therefore 720 to 2700 m. As other factors must enter into account, weight, size and cost in particular, it is believed that for these treatment times the practical rate of flow is on the order of 10 to 15 $m^3$/hour, particularly when portable installations are concerned.

Therefore, the most important problem is the arranging of such a length in a compact form, which takes into account the use of the material constituting the pipe.

In accordance with the present invention, the tubular reactor is arranged in its total length or in sections thereof within one or more containers (understood in the broadest sense) which are preferably superimposable. These containers may be made of any material, provided that the mechanical properties of these materials permit this. This container will preferably be in the form of a double parallelepiped or of a double cylinder or of any other intermediate double form, the concentric elements defining the container proper between them.

Within this container, the tube is wound in spirals which adjoin each other or are slightly spaced apart but parallel, from the inner edge of the large parallelepiped or large cylinder (entrance of the fluid debouching onto the outer surface) towards the outer edge of the small parallelepiped or small cylinder and then by superimposition over a lower coil from the outer edge of the small parallelepiped or small cylinder towards the inner edge of the large parallelepiped or large cylinder, so that the end of the reactor or of a cross section thereof can terminate at an outer face, preferably at the inlet face.

The number of stages is therefore preferably selected in such a manner that the tube or pipe extends from the outer edge towards the inner edge or vice versa.

It goes without saying that the mechanical properties of the container will be one of the limiting factors with regard to its dimensions.

As the curvature of the tube or pipe must be limited for various reasons, primarily of a mechanical nature, there is a region which is unutilized in the central portion of the container and in the four corners thereof if a strict parallelepiped form is used. Along the same idea this does not exclude a container of ring shape, with or without straight parts.

The advantages of the arrangement of the tube or pipe in a container are as follows:

a. Contains the continuous spiral (helicoidal shape);

b. Permits possibly heating or cooling of the pipe by means of an external fluid;

c. Obtains a flexible system to carry out the various treatments in the sense that if it is desired to increase or decrease, for instance, the reaction times one can add or subtract one or more containers, they being interconnectable.

The system of stacking the containers permits a saving in base surface as compared with the system of arranging the containers one alongside the other.

It furthermore makes it possible—still in a desire to save space—to use the central part in order to place there a settler 18, preferably of the accelerated settling type (with tubes, plates, etc.), the outlet of the upper container pipe possibly corresponding to the inlet to said settler.

The system of stacking the containers makes it possible, in fact, to obtain a continuous, practically helicoidal spiral extending from the bottom towards the top (if one takes the point of view of the water or effluents to be treated) so that gases or vapors can be more easily eliminated.

In any event, with the speeds of the water or effluents recommended here there is no accumulation of gas or vapor even if, for instance, in the section reserved for the flocculation, the liquid possibly flows downward in order more readily to entrain the flocculations which at times are heavy and capable of circulating at lower speed than the liquid (danger of accumulation).

Each container may contain within the free spaces one or more metering pumps and on the outer faces there may be arranged the inlets and outlets for reagents for metering pumps, the passage sight windows, inlets for probes or electrodes, sensitive elements of control instruments which are inserted in the pipe, and lead-throughs for feed conductors so that each container may constitute a complete treatment assembly.

If necessary, a static mixer can be arranged also behind each inlet of reagent into the pipe. The section may also contain air lifts and/or ejectors and/or ultrasonic generators.

It goes without saying that these containers, when they are superimposed, can be fastened to each other, namely by straps, in the widest sense, including feet located on the inner face which fit into recesses provided for this purpose in the container which is lower than it.

For reasons of economy, the joint between two superimposable containers may also be made watertight so that the bottom of one corresponds to the cover of the other.

As has been stated above, each container, for reasons of weight, mechanical strength, ease in mounting, handling and transportation or else in order to avoid the crushing of the pipes if the latter are formed of a flexible material (for instance plastics), may contain only a limited number of superimposed stages of pipes, particularly if the turns are arranged side by side without support or spacer or reinforcement. However, the foregoing does not exclude the use thereof in order to assure said assembly a certain immobility of the pipe and also permit a cooling or heating by fluid outside the pipe.

Provided that the weight and the size permit this, another arrangement of the tubular reactor consists also in placing the pipe or tube in superimposed concentric spirals, with the same concept as that previously described and this in the broadest sense, within a supporting reinforcement within which the pipe or tube constituting the tubular reactor can be rigidly fixed by means of straps or in recesses cut in both vertical and horizontal supports.

It goes without saying that this type of design, like the previous one, must permit the normal play of expansion and extension of the pipe.

As in the previous case, the support reinforcement may contain the metering pumps and the outer faces comprise the same elements as those arranged on the outer faces of the containers previously described.

The settler 18 provided for this installation is preferably of the accelerated settling type with tubes or plates, in which various improvements are made. It is in the form of an oblique prism with rectangular base, adjoining at its base an inverted pyramid. Its functions are as follows:

(a) To assure the evacuation of the gases, vapors or air without polluting the immediate environment of the installation;

(b) To separate the flocculations from the water or effluents treated;

(c) To entrain the major part of the flocculations or precipitations to the outside of the installation.

The settler has five compartments. The first 19, in which the inlet of the settler is located at the upper part, receives the gases, vapors, air and water charged with suspended particles (flocculants). The closed space over the water level permits the separation of the gases, vapors or air from the water for purposes of evacuation through a pipe 20. Its lower portion contains inclined plates 21, preferably of an angle of inclination of 55°, over which the flocculations carried by the water or effluents treated slide. In this compartment, the water and the flocculations move in the same direction, that is to say from the top to the bottom.

The second comparatment 22 is a free space in which the water and a part of the precipitate travel horizontally.

The third and fourth compartments 23, 24, located side by side and also adjoining the first, have inclined plates or tubes 25, preferably at an angle of 55°, in which the particles entrained by the ascending stream of water deposit on them and then descend in countercurrent direction towards the second compartment 22 and the fifth compartment 26.

In these compartments, the speed of the water is at least one-half less than that of the first compartment. A rate of ascent of 1 mm/second will preferably be chosen.

The fifth compartment 26 which is below the compartments one, three, four and two has the purpose of concentrating, by its pyramidal shape, the particles coming from the other compartments. This fifth compartment is separated from the others by an assembly of thin-walled vertical tubes 27 of a diameter of 2 to 5 cm and a length of 10 cm, arranged one alongside of the other. These tubes may have an inclination of 0° to 60°, this being the angle formed by the direction of flow of the water in the wall of the tubes (acute angle). Furthermore, below the first compartment 19 a curved plate 22' which partially covers these tubes 27, imparts a horizontal movement to the water.

The thin-wall vertical tubes have the purpose, while permitting the precipitates to descend in the fifth compartment, of creating an eddyless zone, thus avoiding the upward entrainment of precipitates which have already settled out.

At the apex of the inverted pyramid, that is to say at the lowest part of the settler, a pipe preferably connected to an adjustable-flow pump 28 discharges to the outside the muds formed of the flocculents or the precipitates.

In order to obtain a uniform discharge of the muds and also an easy freeing of the precipitate which may have stuck to the walls, plates and tubes of the settler, a magnetic or mechanical vibrating agitator 29 of adjustable stroke which operates continuously or intermittently can be arranged in this fifth compartment.

It goes without saying that one or more mechanical or electromagnetic vibrators can be arranged on the outer walls of the fifth compartment, although the previous solution (vibrations within the suspension) is preferable, particularly in the case of a metal settler with welded walls.

The water or effluent, freed of the precipitates, which emerges from the upper part of compartments 3 and 4 flows over a collector plate 30, which is crenellated or provided with peaks, and is evacuated towards the filters. The level of this plate is preferably a few centimeters below the level of the entrance pipe of the settler.

The water which has been freed of the major part of the solid matter is fed by gravity from the outlet of the settler into a receiving tank 31, in which a pump 32 or the intake of the pump feeding the filters 33 is located. This tank is provided with an overflow and a drain pipe.

It also contains the pH-meter electrodes and other sensitive elements of the control apparatus. The level of the water is checked by two probes, high-level and low-level, which control the operation of the pump feeding the filters. The useful volume of this tank is calculated in such a manner that, taking into account the rate of discharge of the water from the settler, the pump starts and stops only a few times per hour of operation.

The piping connecting the pump to the filters will be provided with a non-return valve and a pressure gauge, preferably of contact type, so as to signal (lamp or acoustic signal) the limit design pressure of the filter or filters or the degree of clogging of the filter or filters.

In view of the high percentage of solid-liquid separation obtained by means of the settler described above, the solid-liquid separation is supplemented by means of a filter or several filters arranged in parallel, the main characteristic of the filter raw material (fabric, reinforced paper) being its porosity of 50 to 1 micron and preferably 10 to 5 microns.

If necessary, in the event that it is desired to obtain a drinkable water, this filter 33 will be followed by bacteriological filters 34, the main characteristic of which is a porosity of 1 to 0.1 micron and preferably 0.4 to 0.2 micron.

The purification apparatus has auxiliary apparatus such as:

(a) The metering pumps intended to inject the reagents;

(b) An electrical generating group if the installation is mobile and/or is to operate independently;

(c) The compressor intended for the aeration of the floating intake;

(d) The compressor intended to feed the ozonizer (with air drier);

(e) The ozonizer or generator of gaseous reagents;

(f) The water tank or tanks intended to place the reagents or adsorbents in solution or suspension;

(g) The tanks for the preparation of the reagents in solution or suspension.

In order to avoid the use of an agitator to assure the dissolving and homogenizing of the soluble reagents and the uniform dispersing of the insoluble reagents, understood in the broadest sense, recourse is had in this case to the use of a circulating pump which operates in a closed circuit, this having the advantage of maintaining the homogeneity of the solutions and suspensions, particularly when the tank is empty due to the continuous feeding of the metering pumps.

As the tank is of a cylindrical-conical shape (inverted cone at the base), the arrival of the reagents takes place at the apex of the cone and the departure of the reagents takes place tangentially at the cylindrical portion of the tank or the base of the cone.

This arrangement of the tangential intake produces a turbulent movement within the solution or suspension. Due to the entrance of the solutions or suspensions at the center of the bottom of the tank, a vigorous stirring of the solution or suspensions takes place. In fact, particularly in the case of suspensions, the particles brought by the stream towards the surface of the solution or suspension have a tendency to descend again along the walls, where they again reach the central jet. They are then entrained again towards the surface.

The pipe for the taking in of the solution or suspension intended for the feeding of the metering pumps is placed perpendicular to the wall of the cone of the tank, preferably between the apex of the cone and the intake pipe of the circulation pump.

The hourly rate of flow of the pump should be at least ten times greater than the useful volume of the tank.

As auxiliary apparatus one may furthermore mention:

(h) Post-sterilization apparatus 35 namely with iodine, bromine, hypochloride, chlorine dioxide or any other bactericidal or viricidal agent, in which the water is then directed towards the places of use (36);

(i) Apparatus for the packing of the water produced (flexible reservoirs) or, if there are concerned individual doses of drinking water or doses of small volume, baggers or bottlers operating under aseptic conditions;

(j) Apparatus for packing the precipitates (generally toxic) in the broadest sense, in such a manner that the precipitates are prevented from having any possibility of contaminating the place of their production, both during their evacuation and during their final storing.

The water and aqueous effluent withdrawal and purification treatment installation described above and shown in the accompanying drawing is especially designed to be portable, but it will be clearly understood that it may constitute a fixed installation.

It is furthermore of course understood that various changes may be made in the construction of the constituent elements of the installation without thereby going beyond the scope of the invention.

I claim:

1. In an installation for withdrawal and purification treatment of liquid comprising water and aqueous effluents, respectively, comprising two essential elements, namely a water intake apparatus defining an intake and including means for pretreatments of the liquid to take place in said intake apparatus, and a purification apparatus including means for controlling the purification apparatus by the intake apparatus and for further treatments of the liquid to take place in the purification apparatus, the purification apparatus having a settling unit for settling out heavy matter, the improvement comprising a single pump means for transferring the water and aqueous effluents, respectively, to be treated from the intake all the way up to the settling, a continuous tubular reactor, extending from the intake apparatus to the purification apparatus, of tubular form and length and operatively connected with said pump means, the latter for forcing the liquid through said continuous tubular reactor, said pump means for providing a rate of flow which conditions all of the pretreatments in the water intake apparatus and all of the treatments in the purification apparatus and being such that the linear velocity of liquid plus any particles circulating in the tubular reactor is between 0.40 m/sec and 1 m/sec, said water intake apparatus comprises, a receptacle adapted to be partially immersed, floats support said receptacle such that the receptacle is partially immersed in the water and aqueous effluents, said receptacle is formed with a hydrodynamically shaped front and rear formed by an inclined grid constituting said intake through which the liquid flows, said receptacle having an interior portion located in front of said grid downstream with respect to the flow of the water and the aqueous effluents, respectively, to be treated, said interior portion forms an aeration compartment constituting means for aerating the water and aqueous effluents and liberating air bubbles, said aerating means comprises a plurality of porous members, said aeration compartment has an upper open edge extending above the surface of the water and aqueous effluents, the degree of immersion of said receptacle by means of said floats being such that said open edge of said aeration compartment does not permit entry of water that has not passed through said grid.

2. In an installation for withdrawal and purification treatment of liquid comprising water and aqueous effluents, respectively, comprising two essential elements, namely a water intake apparatus defining an intake and including means for pretreatments of the liquid to take place in said intake apparatus, and a purification apparatus including means for controlling the purification apparatus by the intake apparatus and for further treatments of the liquid to take place in the purification apparatus, the purification apparatus having a settling unit for settling out heavy matter, the improvement comprising a single pump means for transferring the water and aqueous effluents, respectively, to be treated from the intake all the way up to the settling, a continuous tubular reactor, extending from the intake apparatus to the purification apparatus, of tubular form and length and operatively connected with said pump means, the latter for forcing the liquid through said continuous tubular reactor, said pump means for providing a rate of flow which conditions all of the pretreatments in the water intake apparatus and all of the treatments in the purification apparatus and being such that the linear velocity of liquid plus any particles circulating in the tubular reactor is between 0.40 m/sec and 1 m/sec, said water intake apparatus comprises, a receptacle adapted to be arranged on land, said receptacle is formed with an interior part, an inclined grid constituting the intake and through which the liquid is adapted to flow is disposed in said interior part, said grid constitutes means for separating said interior part on an upstream side thereof relative to a flow of the water and aqueous effluents, respectively, into a water inlet compartment and on a downstream side thereof relative to the flow of the water and aqueous effluents, respectively, into an aeration compartment constituting means for aerating the water and aqueous effluents and liberating air bubbles, said aerating means comprises a plurality of porous members, means for feeding the water and aqueous effluents, respectively, into said water inlet compartment, an overflow means located beneath the level of an upper edge of said grid, for preventing entry of the water and aqueous effluents, respectively, which have not passed through the grid.

3. The installation according to claims 1 or 2, wherein said aeration compartment has a downstream end comprising a partition defining an adjacent compartment downstream thereof, said partition having a height from a bottom thereof such that the liberated air bubbles cannot enter into said adjacent compartment, said pump means is located in said adjacent compartment, whereby the air bubbles cannot reach said pump means.

4. The installation according to claims 1 or 2, wherein said grid is inclined at 45 degrees relative to the horizontal and has a mesh size of the order of 2 mm.

5. The installation according to claims 1 or 2, wherein said porous members are tubes.

6. The installation according to claims 1 or 2, wherein said porous members are plates.

7. In an installation for withdrawal and purification treatment of liquid comprising water and aqueous effluents, respectively, comprising two essential elements, namely a water intake apparatus defining an intake and including means for pretreatments of the liquid to take place in said intake apparatus, and a purification apparatus including means for controlling the purification apparatus by the intake apparatus and for further treatments of the liquid to take place in the purification apparatus, the purification apparatus having a settling unit for settling out heavy matter, the improvement comprising a single pump means for transferring the water and aqueous effluents, respectively, to be treated from the intake all the way up to the settling, a continuous tubular reactor, extending from the intake apparatus to the purification apparatus, of tubular form and length and operatively connected with said pump means, the latter for forcing the liquid through said continuous tubular reactor, said pump means for providing a rate of flow which conditions all of the pretreatments in the water intake apparatus and all of the treatments in the purification apparatus and being such that the linear velocity of liquid plus any particles circulating in the tubular reactor is between 0.40 m/sec and 1 m/sec, a container, said tubular reactor is arranged with its entire length in said container, said reactor is formed as a tubular member wound in a series of superimposed turns, the number of said turns being such that an end of said tubular member terminates on an outer surface of said container, said turns form a free central region adapted to receive said settling unit.

8. In an installation for withdrawal and purification treatment of liquid comprising water and aqueous effluents, respectively, comprising two essential elements, namely a water intake apparatus defining an intake and including means for pretreatments of the liquid to take place in said intake apparatus, and a purification apparatus including means for controlling the purification apparatus by the intake apparatus and for further treatments of the liquid to take place in the purification apparatus, the purification apparatus having a settling unit for settling out heavy matter, the improvement comprising a single pump means for transferring the water and aqueous effluents, respectively, to be treated from the intake all the way up to the settling, a continuous tubular reactor, extending from the intake apparatus to the purification apparatus, of tubular form and length and operatively connected with said pump means, the latter for forcing the liquid through said continuous tubular reactor, said pump means for providing a rate of flow which conditions all of the pretreatments in the water intake apparatus and all of the treatments in the purification apparatus and being such that the linear velocity of liquid plus any particles circulating in the tubular reactor is between 0.40 m/sec and 1 m/sec, a plurality of containers, said tubular reactor is arranged in sections of its length respectively disposed in said containers, each said section of said tubular reactor is wound in a series of superimposed turns, the number of said turns being such that an end of one of said sections terminates on an outer face of one of said containers, said containers are interconnectable and stackable, and said turns form a free central region adapted to receive said settling unit.

9. In an installation for withdrawal and purification treatment of liquid comprising water and aqueous effluents, respectively, comprising two essential elements, namely a water intake apparatus defining an intake and including means for pretreatments of the liquid to take place in said intake apparatus, and a purification apparatus including means for controlling the purification apparatus by the intake apparatus and for further treatments of the liquid to take place in the purification apparatus, the purification apparatus having a settling unit for settling out heavy matter, the improvement comprising
- a single pump means for transferring the water and aqueous effluents, respectively, to be treated from the intake all the way up to the settling,
- a continuous tubular reactor, extending from the intake apparatus to the purification apparatus, of tubular form and length and operatively connected with said pump means, the latter for forcing the liquid through said continuous tubular reactor,
- said pump means for providing a rate of flow which conditions all of the pretreatments in the water intake apparatus and all of the treatments in the purification apparatus and being such that the linear velocity of liquid plus any particles circulating in the tubular reactor is between 0.40 m/sec and 1 m/sec,
- a support reinforcement,
- said continuous tubular reactor comprises a tubular member arranged in superimposed concentric spirals in said support reinforcement, said tubular member is rigidly fixed within said support reinforcement,
- said spirals form a free central region adapted to receive said settling unit.

* * * * *